(12) United States Patent
Bohle et al.

(10) Patent No.: US 8,654,327 B2
(45) Date of Patent: Feb. 18, 2014

(54) SPECTROMETER COMPRISING SOLID BODY SENSORS AND SECONDARY ELECTRON MULTIPLIERS

(75) Inventors: Wolfram Bohle, Kleve (DE); Ulrich Heynen, Kalkar (DE)

(73) Assignee: Spectro Analytical Instruments GmbH, Kleve (DE)

(*) Notice: Subject to any disclaimer, the term of this patent is extended or adjusted under 35 U.S.C. 154(b) by 536 days.

(21) Appl. No.: 12/602,902

(22) PCT Filed: Jun. 6, 2008

(86) PCT No.: PCT/EP2008/004529
§ 371 (c)(1),
(2), (4) Date: Jan. 19, 2010

(87) PCT Pub. No.: WO2008/148562
PCT Pub. Date: Dec. 11, 2008

(65) Prior Publication Data
US 2010/0177308 A1    Jul. 15, 2010

(30) Foreign Application Priority Data
Jun. 8, 2007    (DE) .................. 10 2007 027 008

(51) Int. Cl.
*G01J 3/28*    (2006.01)

(52) U.S. Cl.
USPC ............................ 356/326; 356/313; 356/317

(58) Field of Classification Search
USPC .................. 356/326–328, 313, 317–318, 417
See application file for complete search history.

(56) References Cited

U.S. PATENT DOCUMENTS

| 4,060,327 | A | * | 11/1977 | Jacobowitz et al. | .......... 356/328 |
| 4,571,074 | A | * | 2/1986 | Thevenon | ..................... 356/328 |
| 4,592,655 | A | * | 6/1986 | Slickers | ........................ 356/313 |
| 5,420,681 | A | * | 5/1995 | Woodruff | ...................... 356/328 |
| 5,422,712 | A | * | 6/1995 | Ogino | ............................ 356/73 |
| 5,699,155 | A | * | 12/1997 | Sugihara | ....................... 356/313 |
| 6,614,528 | B1 | * | 9/2003 | Bohle | ............................ 356/328 |
| 2007/0177149 | A1 | * | 8/2007 | Aronkyto et al. | ............. 356/417 |
| 2008/0273199 | A1 | * | 11/2008 | Maier et al. | .................... 356/301 |

FOREIGN PATENT DOCUMENTS

EP    0432842 A1    6/1991

OTHER PUBLICATIONS

Xiao Ming et al.: "An Improved Instrument for Measuring Time-Resolved Lanthanide Emission and Resonance Energy Transfer," Review of Scientific Instruments, AIP, Melville, NY, US, vol. 70, No. 10, Oct. 1, 1999, pp. 3877-3881.
English Language International Preliminary Report on Patentability and Written Opinion issued in related International Application No. PCT/EP2008/004529 on Jan. 12, 2010.

* cited by examiner

*Primary Examiner* — Kara E Geisel
(74) *Attorney, Agent, or Firm* — Novak Druce Connolly Bove + Quigg LLP

(57) ABSTRACT

The invention relates to a spectrometer for analyzing the optical emission of a sample by means of pulsed excitation of an optical spectral emission, having an excitation source, a gap arrangement, at least one dispersive element and having detectors for the emitted spectrum, in which two beam paths are provided with two dispersive elements, the first dispersive element of which images the spectrum of the emission onto a number of spatially resolving detectors and the second dispersive element of which images the spectrum of the emission onto a number of time-resolving detectors.

10 Claims, 1 Drawing Sheet

1    Pulsed Plasma Source
2    Housing
3    Primary Gap Arrangement
4, 7    Concave Diffraction Gratings
5    Mirror
6    Module with Secondary Entrance Gap and Mirror
8    Solid Body Sensors (e.g., CCD Arrays, CMOS Arrays, CID arrays)
9    Exit Gap
10    Secondary Electron Multipliers (e.g. Photomultipliers)

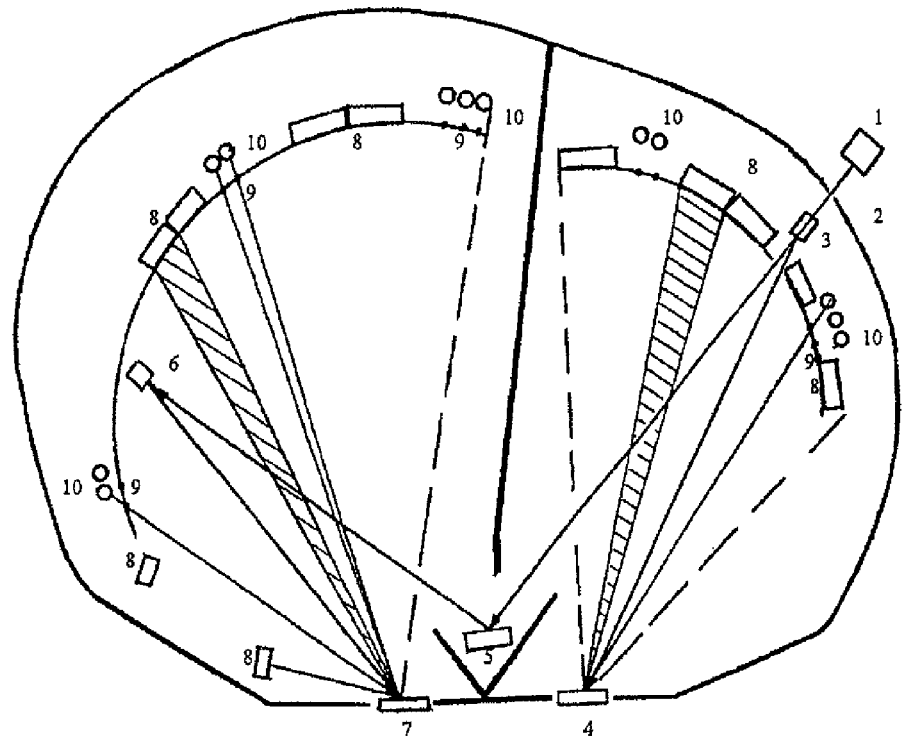
| | |
|---|---|
| 1 | Pulsed Plasma Source |
| 2 | Housing |
| 3 | Primary Gap Arrangement |
| 4, 7 | Concave Diffraction Gratings |
| 5 | Mirror |
| 6 | Module with Secondary Entrance Gap and Mirror |
| 8 | Solid Body Sensors (e.g., CCD Arrays, CMOS Arrays, CID arrays) |
| 9 | Exit Gap |
| 10 | Secondary Electron Multipliers (e.g. Photomultipliers) |

SPECTROMETER COMPRISING SOLID BODY SENSORS AND SECONDARY ELECTRON MULTIPLIERS

CROSS-REFERENCE TO RELATED APPLICATIONS

This application is a 35 U.S.C. 371 National Stage Application of International Application No. PCT/EP2008/004529, filed Jun. 6, 2008, which claims priority from German Application No. 102007027008.0, filed Jun. 8, 2007, the entire contents of which are incorporated herein by reference.

The present invention relates to a spectrometer for analysing the optical emission of a sample by means of pulsed excitation.

To excite a generally metal sample, a spark discharge is generated between the sample and an electrode, the high temperature in this discharge causing the material to be excited and to release characteristic radiation in the optical region as well as in the UV region. The radiation is then fanned out over an optical system according to the wavelength. Sensors sit at the interesting places of the developing spectrum in order to be able to determine the intensity of the various spectral lines. This then allows a conclusion to be made as regards the relative fractions of the individual chemical elements in the analysed sample.

To register the radiation, two different types of sensors are employed in practice. On the one hand, solid body sensors are used, in which a plurality of pixels are arranged in one or more lines. These lines thereby cover a wavelength range so that, apart from the individual spectral line, "the spectral environment" can also be measured. These detectors are implemented as CCD arrays, CMOS arrays, photodiode arrays or CID arrays. The measurement method can be designated spatially resolving and time-integrating.

The second type of sensors is formed by the secondary electron multipliers, thus for example by photomultipliers and channeltrons. These detectors produce an electrical charge proportional to the incident photon flow. They are not spatially resolving, since the entire photon flow falling onto the primary electrode is evaluated. These sensors, however, are time-resolving, since the intensity sequence of the incident photon flow is directly reproduced by the electrical charge emitted. In contrast to the solid body sensors, a time resolution in the region of one microsecond can be obtained with correspondingly fast evaluation electronics. These two systems have pros and cons in each case. Solid body sensors form the spectral environment, so that apart from a possibly searched line the spectral background or strong spectral lines, existing near the searched line, can also be detected and evaluated at the same time. The secondary electron multipliers (SEMS) for example have advantages in the case of atom lines, which due to lower transition probability, during or immediately after excitation, through the spark have minimum intensity and are therefore hard to detect in the background.

These lines, however, have a relatively long fade-out time, so that after the end of the excitation of the first strong light emission, from these slow transitions, a signal is still available for up to 100 microseconds, which is then practically free of background signals from the excitation. These slow transitions with the time-resolving SEM detectors enable precisely these lines to be determined particularly well.

In practice, these two measurement methods are implemented with different spectrometers which have either solid body sensors or secondary electron multipliers as detectors. Spectrometers with both types of detectors do not exist for various reasons.

German Patent Application DE 19853754A1 discloses a spectrometer for the emission spectroscopy of ICP plasmas, thus for light sources, which work in continuous operation. Two spectra with different wavelength ranges are generated on congruent focal curves, i.e. at the same place. The spectra are detected in a spatially resolved way by a set of semiconductor line sensors. The technical focal point in this document is the simultaneous generation of two spectra with substantially different wavelength ranges on the congruent (thus spatially the same) focal circle of two gratings, wherein the light falls via a single entrance gap only onto the first grating and the second grating receives zero diffraction order light of the first grating.

Photomultipliers are not used in this spectrometer, since with continuous light source spectroscopy they do not have any advantages over the CCD arrays used. Nevertheless, in the document they are also mentioned optionally as radiation detectors. It is not disclosed, however, that simultaneous use of both detectors is possible and advantageous. The document is also not concerned with time-resolved spectroscopy of pulsed sources.

It is therefore the object of the present invention to provide spectrometers, in which both types of detectors are used and thus both spatially resolving and time-resolving detectors are available.

Advantageously, the emission of the exciting spark is guided through a common aperture into the spectrometer and fed to the two groups of sensors there. At the same time, it is possible to feed the entire spectrum to both groups of sensors in each case, if a dispersive element, for example a diffraction grating, is provided for each group of sensors. The sensors of both groups are preferably spatially arranged in one plane. To this end, it may be proposed that one part of the spectrum is guided via a narrow gap and a dispersive element onto a group of sensors, while a second part of the spectrum is guided via an auxiliary gap with a relatively large width onto a tilted mirror and from there through a second gap onto a second dispersive element, where it is spectrally fanned out and guided to the second group of sensors.

Finally, it is advantageous if the second part of the spectrum is guided from the auxiliary gap onto a first mirror, and from there through the second main gap onto a second mirror, so that the two dispersive elements can lie next to each other and the groups of sensors can be arranged roughly as a mirror-image. The first mirror preferably can be arranged between the two dispersive elements.

The new spectrometer was specially developed for spark spectrometry with the aim of utilising, in the same system and simultaneously, both the advantages of the photomultipliers with regard to carrying out time-resolved measurement of individual spectral lines and the advantages of the CCD/CMOS array sensors with regard to carrying out spatially resolved measurement over large spectral ranges.

Two spectral modules are proposed, i.e. two spectra are generated simultaneously by two gratings, however, if these two gratings are operated independently of each other, i.e. the one grating does not receive zero diffraction order light from the other grating, in contrast to the prior art. The gratings, each one on its own, are to generate the spectrum of the source.

Although the focal curves of the two gratings lie in one plane, they are separate from one another. Nowhere do they overlap or are in contact. The two spectra develop at different places.

A further substantial advantage of the new spectrometer over the prior art consists in the channelling of a beam of light onto the gratings. Each of the two gratings receives light from the same and only interface for radiation coupling into the spectrometer. The interface consists of two gaps, spaced apart next to one another, of varying width. The light from the narrow gap arrives via a tilted mirror closely behind the gap directly at the first grating. It thus serves as an entrance gap for the first spectral module. The light from the wide gap is projected onto a further narrow gap inside the S by a hollow mirror. This secondary gap serves as an entrance gap for the second spectral module. In this way, both spectral modules can be arranged next to one another as a mirror-image, saving space.

Fundamental to the new spectrometer is the double, simultaneous generation of the spectrum of a pulse driven radiation source with substantially the identical wavelength range with two optically independent spectral modules (gratings) in a common frame structure with a common interface for light coupling, wherein in the first spectral module, the spectrum is detected with semiconductor array detectors in a spatially resolved wide-band way and simultaneously in the second spectral module, arbitrary, discrete wavelengths are measured with photomultipliers in a time-resolved way.

The invention is described below in more detail on the basis of the drawing, wherein:

The FIGURE shows a schematic beam path of a spectrometer according to the invention in a view from above onto the main plane.

The FIGURE, in a schematic illustration, shows a spectrometer with a pulsed plasma source in the form of a spark 1, which is generated between an electrode and a sample to be analysed. The plasma source is pulsed with a frequency of approximately 300-1000 Hz per second, the life of an individual spark lasting about 100 microseconds.

The optical emission developing during and after excitation, through a gap arrangement 3, enters a housing 2 in which the spectrometer optics are located. A distinction must be made between a first beam path and a second beam path, which are illustrated as continuous lines.

The first beam path runs from a narrow first entrance gap in the gap arrangement 3 to a first grating 4, which spectrally fans out the incident light and which images the gap onto a number of solid body sensors 8. The arrangement of gap 3, grating 4 and solid body sensors 8 is a so-called Paschen-Runge arrangement, which is known per se. The solid body sensors 8 are arranged on the focal circle of the grating 4. In order to intensify the signal, cylindrical mirrors can be used in front of the solid body sensors, as described in French Patent FR 99 14572 and U.S. Pat. No. 6,614,528.

The second beam path begins at a second gap in the gap arrangement 3. This second gap is substantially wider than the first gap. While the first gap is about 10 to 20 micrometers wide, this gap has a width of 250 to 400 micrometers. The second gap therefore allows substantially more light to enter into the second beam path. The light firstly falls onto a first mirror 5, from which it is deflected to a secondary gap in the module 6. The gap in module 6 has a width of 10 to 20 micrometers. The light exiting this gap is then guided via a further mirror in the module 6 onto a second grating 7, which spectrally fans out the light and guides it further to a number of photomultipliers 10 which are arranged on the focal curve of the second grating 7. Up to the deflection via the mirror arrangements 5 and 6, the second beam path also corresponds to a Paschen-Runge arrangement. The light of the second beam path is, in particular, not reflected in zero diffraction order by the first grating. Preferably, it does not strike the first grating.

The emission of the spark 1 and the plasma generated thereby can now likewise be spectrally analyzed by the second beam path with the photomultipliers 10, like the light guided in the first beam path onto the solid body sensors 8. The photomultipliers 10, for their part, sit at certain places in the spectrum, at which the spectral lines, essential for analyzing the sample, are located. Further narrow gaps 9 which fade out fractions lying directly next to the spectral lines are provided directly in front of the photomultipliers 10. In contrast to the solid body sensors 8, this is necessary because the secondary electron multipliers 10 are not spatially resolving.

With the arrangement described, on the one hand the light, generated by the spark 1, in the beam path which runs from the first gap via the first grating 4 to the solid body sensors 8, can now be picked up as a spectrum in a time-integrated way. The entire emission of an excitation pulse is picked up. It can also be integrated over a plurality of excitation pulses, so that the sensitivity and with it signal-to-noise ratio are improved. In addition, the spectral environment can be picked up around the line to be evaluated, due to the spatially resolving characteristics of the solid body sensors 8, and its influence on the evaluated line can be assessed.

On the other hand, the same emission via the second beam path can be evaluated with photomultipliers 10. In this case, the photomultipliers 10 are suitable for detecting the time sequence of a single excitation, particularly the fade-out of the optical emission in the plasma after the excitation is completed. A relatively weak spectral line, which lies in the background of a directly adjacent, strong spectral line and therefore could not be resolved with the solid body sensors 8, can possibly be identified on the basis of the time sequence. For this purpose, the respective photomultiplier 10 can be read out with a resolution of up to one microsecond, so that the emission of a weak, slowly fading-out line clearly emerges toward the end of the measurement interval in contrast to the fast fading-out background of an intensive, adjacent line. The period to be evaluated, after the spark, which itself has a burning duration of approximately 100 microseconds, has ended can again amount to 25 to 100 microseconds. In this period, the signal is then practically background-free.

As a result of the structural arrangement described, it is possible to arrange the two beam paths in each case in a Paschen-Runge arrangement in a housing and essentially in one optical plane. This arrangement has the advantage that a compact mechanical arrangement with corresponding stability against deformation or length variation is made possible. On the other hand, the arrangement of the two beam paths in a common housing and in one plane has the advantage that the sensors 8 and 10 respectively in the flat, level housing are accessible from both sides e.g., from above and from below the dispersion plane). In this way, it is possible to achieve a particularly close grouping of the sensors 8 and 10 on the focal curve. This enables solid body sensors and secondary electron multipliers to be operated simultaneously and thus the spatially-resolved signal and the time-resolved signal of a spark to be measured in parallel.

The invention claimed is:

1. A spectrometer for analyzing the optical emission of a sample by means of pulsed excitation, the spectrometer having:

an excitation source arranged to excite the sample and to cause the emission of an optical spectral emission by the excited sample, a gap arrangement configured to receive the optical spectral emission, at least two dispersive elements configured to receive respective beams output by the gap arrangement in response to the optical spectral emission, and a plurality of detectors for the emitted spectrum, wherein two beam paths are formed within the spectrometer, using the two dispersive elements, each of which dispersive elements is configured to image the spectrum of the emission onto a multiplicity of detectors of the plurality of detectors, the multiplicity of detectors including at least one time-resolving detector configured to detect a time sequence of a single excitation, wherein the multiplicity of detectors includes a number of spatially resolving detectors, a number of further time-resolving detectors, or a combination of spatially resolving detectors and further time-resolving detectors, and wherein the multiplicity of detectors includes one or more spatially resolving detectors that are solid body detectors.

2. The spectrometer according to claim 1, wherein the time-resolving detectors are secondary electron multipliers.

3. The spectrometer according to claim 1, wherein the two beam paths essentially lie in one plane.

4. The spectrometer according to claim 1, wherein at least one of the two beam paths is guided via at least one tilted mirror.

5. The spectrometer according to claim 4, wherein the at least one of the two beam paths has a first wide gap and a second narrow gap, wherein the first gap lies between the excitation source and the first tilted mirror, and wherein the second gap lies between the at least one tilted mirror and one of the dispersive elements.

6. The spectrometer according to claim 4, wherein the first tilted mirror is arranged between the two dispersive elements.

7. The spectrometer according to claim 1, wherein an arrangement of the two beam paths in each case corresponds to a Paschen-Runge arrangement.

8. The spectrometer according to claim 1, wherein the first beam path does not incorporate the second dispersive element, and wherein the second beam path does not incorporate the first dispersive element.

9. The spectrometer according to claim 1, wherein the solid body detectors comprise CCD arrays.

10. The spectrometer according to claim 2, wherein the secondary electron multipliers comprise photomultipliers or channeltrons.

\* \* \* \* \*